(12) United States Patent
Ausenda

(10) Patent No.: US 10,870,062 B2
(45) Date of Patent: Dec. 22, 2020

(54) INERTIAL PLATFORM

(71) Applicant: KYNEPROX S.R.L., Turin (IT)

(72) Inventor: Giovanni Ausenda, Casorate Primo (IT)

(73) Assignee: KYNEPROX S.R.L., Turin (IT)

( * ) Notice: Subject to any disclaimer, the term of this patent is extended or adjusted under 35 U.S.C. 154(b) by 0 days.

(21) Appl. No.: 16/077,886

(22) PCT Filed: Feb. 15, 2017

(86) PCT No.: PCT/IB2017/050841
§ 371 (c)(1),
(2) Date: Aug. 14, 2018

(87) PCT Pub. No.: WO2017/141170
PCT Pub. Date: Aug. 24, 2017

(65) Prior Publication Data
US 2019/0047448 A1    Feb. 14, 2019

(30) Foreign Application Priority Data

Feb. 17, 2016 (IT) .............................. UB2016A0805
Mar. 25, 2016 (IT) .............................. UB2016A2054

(51) Int. Cl.
*F16M 11/20* (2006.01)
*A63G 31/02* (2006.01)
(Continued)

(52) U.S. Cl.
CPC ............. *A63G 31/02* (2013.01); *B60N 2/501* (2013.01); *B60N 2/508* (2013.01); *G09B 9/02* (2013.01);
(Continued)

(58) Field of Classification Search
USPC ....... 248/157, 419, 420, 422, 424, 425, 429; 296/65.01, 65.06, 65.07, 65.08, 65.11,
(Continued)

(56) References Cited

U.S. PATENT DOCUMENTS 4,754,713 A    7/1988  Chatenay epouse Compagnone
4,913,482 A *  4/1990  Hanai ..................... B60N 2/501
                                                   248/421

(Continued)

OTHER PUBLICATIONS

Aminzadeh et al., "Model-based motion tracking control of an electric 3DoF parallel motion platform", Aerospace Conference, 2010, IEEE, Piscataway, NJ, USA, Mar. 6, 2010, pp. 1-8, XP031657131.

*Primary Examiner* — Alfred J Wujciak
(74) *Attorney, Agent, or Firm* — Vorys, Sater, Seymour & Pease

(57) ABSTRACT

Provided is an inertial platform including an upper support that can be integrally attached to a mobile element and defines an upper plane, a base support that can be fixed to the ground and defines a base plane, at least one intermediate support arranged between the base and upper supports, articulated quadrilaterals each including two lower hinges, connected to one of the base or intermediate supports, two upper hinges, connected to one of the intermediate or upper supports, two rods which connect the lower hinges to the upper hinges in a crossed manner, and motor means configured to move the articulated quadrilateral internally according to its single degree of freedom defining an axis of rotation, and each including sensing means to detect the position of the upper plane with respect to the gravitational gradient functionally connected to means of control of the platform and at least to the motor means.

20 Claims, 6 Drawing Sheets

(51) Int. Cl.
*G09B 9/02* (2006.01)
*B60N 2/50* (2006.01)
*F16M 11/12* (2006.01)
*B60N 2/39* (2006.01)

(52) U.S. Cl.
CPC ............... *B60N 2/39* (2013.01); *B60N 2/502* (2013.01); *F16M 11/121* (2013.01); *F16M 11/2042* (2013.01)

(58) Field of Classification Search
USPC ..................................................... 296/65.12
See application file for complete search history.

(56) References Cited

U.S. PATENT DOCUMENTS

| | | | | |
|---|---|---|---|---|
| 5,358,305 | A * | 10/1994 | Kaneko | B60N 2/0224 180/89.14 |
| 5,623,878 | A | 4/1997 | Baxter et al. | |
| 2006/0200287 | A1 | 9/2006 | Parison et al. | |
| 2006/0237885 | A1* | 10/2006 | Paillard | B60N 2/501 267/140.15 |
| 2007/0278723 | A1* | 12/2007 | Shoemaker | B60N 2/501 267/131 |
| 2014/0263911 | A1 | 9/2014 | Parker et al. | |
| 2014/0316661 | A1 | 10/2014 | Parker et al. | |
| 2016/0214658 | A1* | 7/2016 | Haller | B60N 2/501 |
| 2018/0022244 | A1* | 1/2018 | Duncan | B60N 2/0276 297/216.17 |

* cited by examiner

INERTIAL PLATFORM

The present invention relates to an inertial platform of the type as recited in the preamble of claim 1.

Multi-dynamic platforms that can be used to move objects, in particular by means of rotation along variable axes, are known in the prior art.

They are used in particular with simulators, video games, various instruments for scientific purposes and so forth.

Said platforms generally comprise a sheet connected to a hinge, suitable to allow it to rotate along a predetermined axis, and a hydraulic or pneumatic piston, suitable to move the sheet about said hinge.

Alternatively, said platforms comprise a rotating motor, with a high torque, suitable to allow the movement of the platform.

The prior art described above has several significant drawbacks.

In particular, said multi-dynamic platforms are very large and bulky. In particular, since they must contain said motors and joints and because they must allow for the various movement spaces, they are very tall.

Said prior art multi-dynamic platforms also require very powerful motors, with a very high torque, or complex fluid-dynamic systems. In particular, on many occasions the position of the centre of gravity varies considerably with respect to the initial position, significantly increasing the resistance arm and thus the moment of resistance, which must be offset by electric motors or the fluid-dynamic systems.

Said platforms are also very expensive, owing to the inconveniences mentioned above.

In this situation, the technical purpose of the present invention is to devise an inertial platform that substantially overcomes the drawbacks mentioned above. Within the sphere of said technical purpose one important aim of the invention is to provide an inertial platform that is compact, in particular with a reduced height.

Another important aim of the invention is to provide an inertial platform that can be operated using smaller motors.

The technical purpose and specified aims are achieved with an inertial platform as claimed in the appended claim 1.

Preferred embodiments are described in the dependent claims.

The characteristics and advantages of the invention are clearly evident from the following detailed description of preferred embodiments thereof, with reference to the accompanying drawings, in which.

Figure 4:
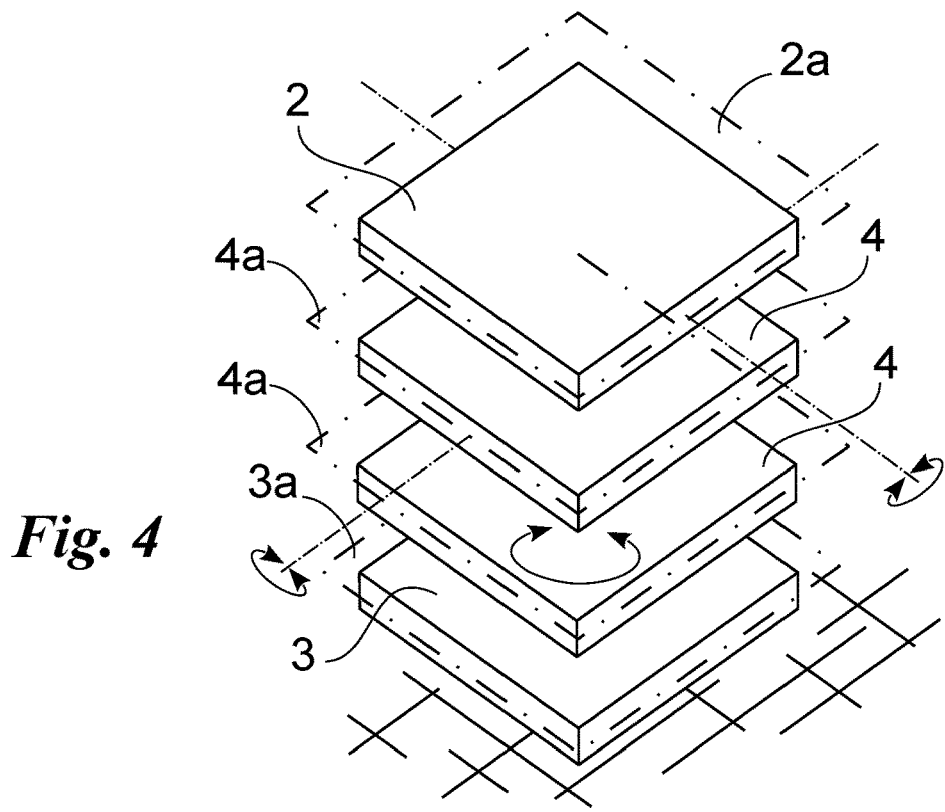
Figure 5:
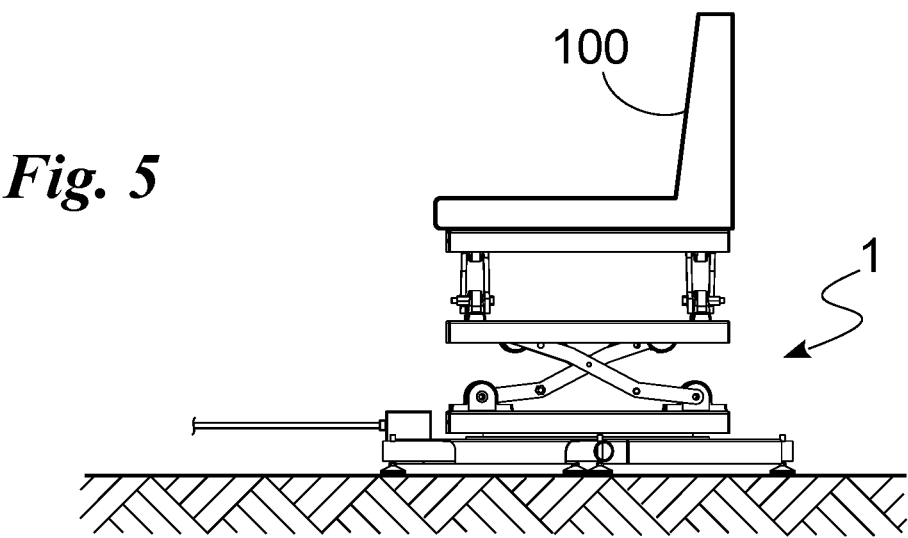
Figure 6:
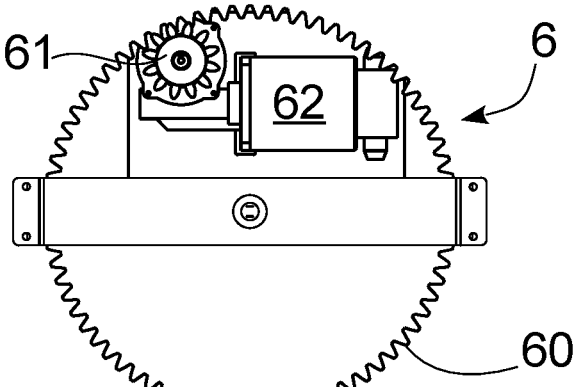
Figure 7A:
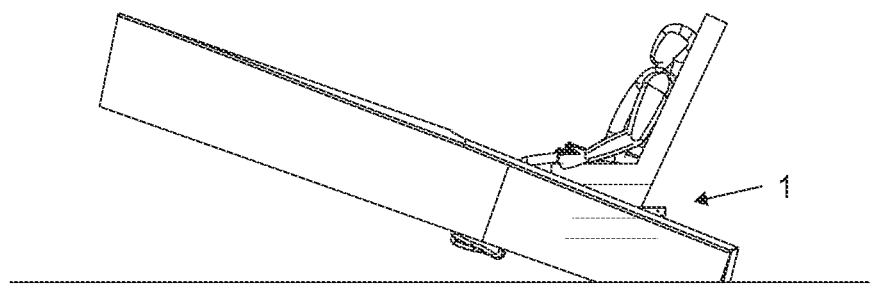
Figure 7B:
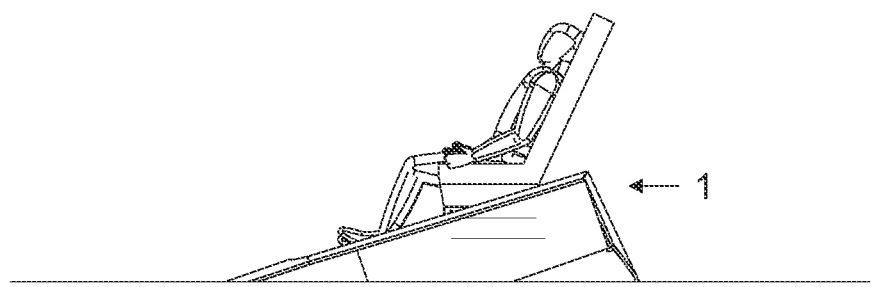
Figure 7C:
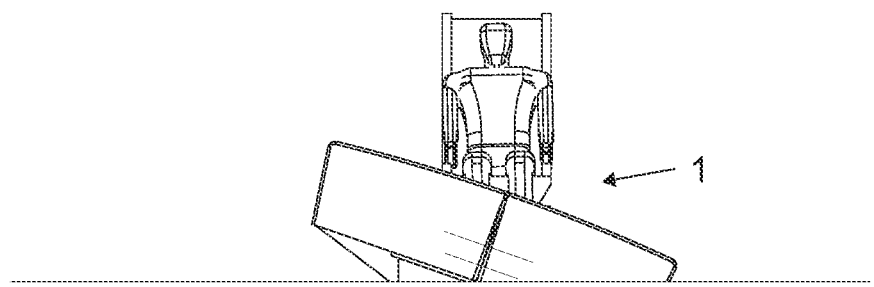
Figure 7D:
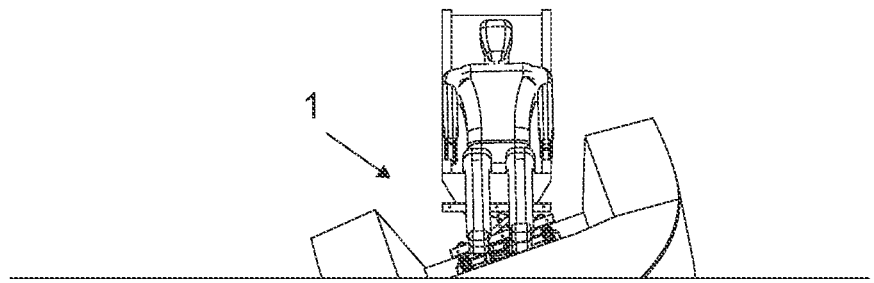
Figure 8:
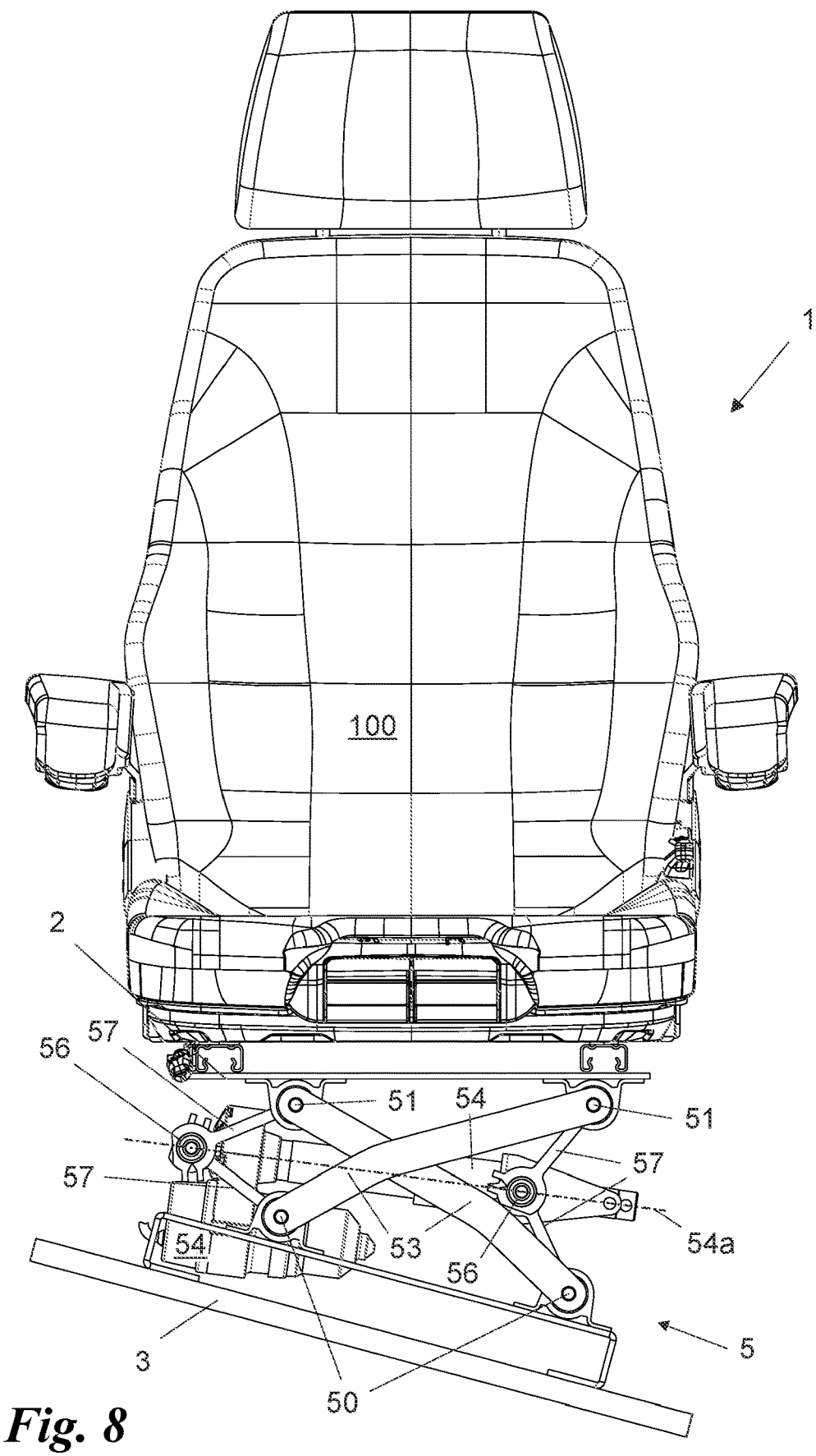
Figure 9:
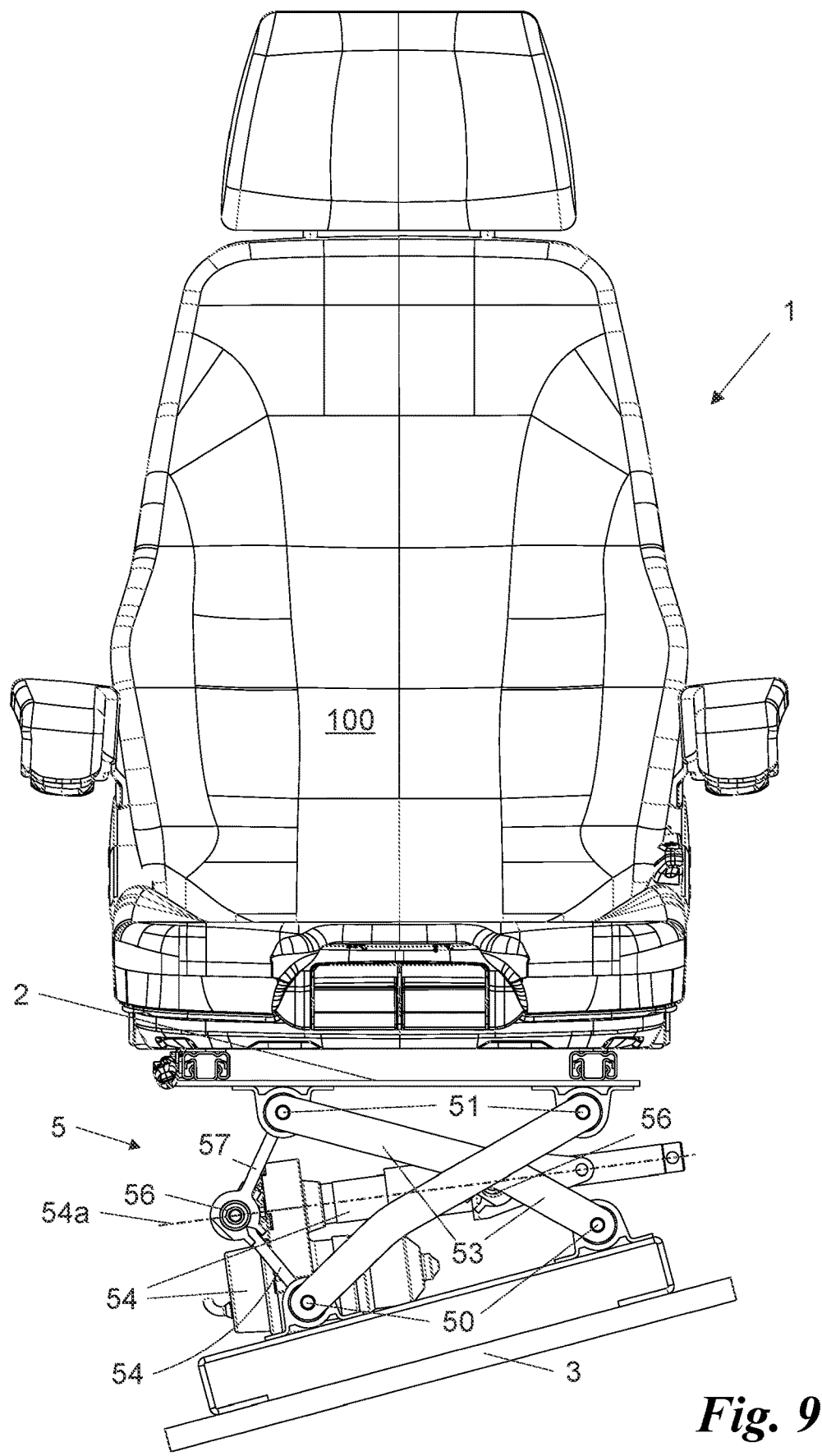

FIG. 4 schematically illustrates an inertial platform according to the invention;

FIG. 5 is a side view of the inertial platform according to the invention supporting a seat and control means;

FIG. 6 is a view from below of the inertial platform according to the invention;

FIG. 7*a* shows an inertial platform used on means of transport in a first position;

FIG. 7*b* shows an inertial platform used on means of transport in a second position;

FIG. 7*c* shows an inertial platform used on means of transport in a third position;

FIG. 7*d* shows an inertial platform used on means of transport in a fourth position;

FIG. 8 is a side view of the inertial platform according to the invention with motor means in an alternative configuration; and FIG. 9 is a side view of the inertial platform according to the invention in a second configuration with motor means in an alternative configuration.

In this document, measurements, values, forms and geometric data (such as perpendicularity and parallelism), when used with terms such as "about" or other similar terms such as "more or less" or "substantially", are to be considered without any measurement errors or inaccuracies due to production and/or manufacturing errors and, above all, without any slight divergence from the value, measurement, form or geometric data with which they are associated. For example, such terms, when associated with a value, preferably indicate a difference of not more than 10% of said value.

Moreover, terms such as "first", "second", "upper", "lower", "main" and "secondary" do not necessarily indicate an order, priority or respective position, but may simply be used in order to make a clear distinction between the different components.

With reference to the Figures, reference numeral 1 globally denotes the inertial platform according to the invention.

It is suitable to be used with a system for video games or for simulation and so on.

Said inertial platform 1 comprises an upper support 2 and a base support 3.

The base support 3 can be fixed to the ground and defines a base plane 3*a*, preferably horizontal. It is thus a metal sheet or any support suitable to sustain the platform 1. It also preferably has a surface subtended by the support points that is large and adjustable, for example with detachable portions or telescopic arms, so that it is both stable and easily transportable.

The upper support 2 defines a mobile upper plane 2*a* and is preferably a metal sheet or a surface defined by a plurality of supports.

The upper support 2 can be integrally connected to a mobile element 100. The mobile element 100, which is not part of the platform 1, may be a seat, a chamber, a flat support or a support of any shape.

The mobile element 100, the inertial platform 1 and other elements, such as a computer and similar devices thus preferably define a system for video games or a simulation system and so forth.

The platform 1 further comprises at least an intermediate support 4 arranged between said base support 3 and upper support 2. Each intermediate support defines an intermediate plane 4*a* and is preferably also a metal sheet or an element suitable to connect several of the devices described later on.

There are preferably one or two intermediate supports and each intermediate support preferably defines a further degree of freedom for the platform, in addition to that between the base support 3 and the upper support 2.

Figure 1:
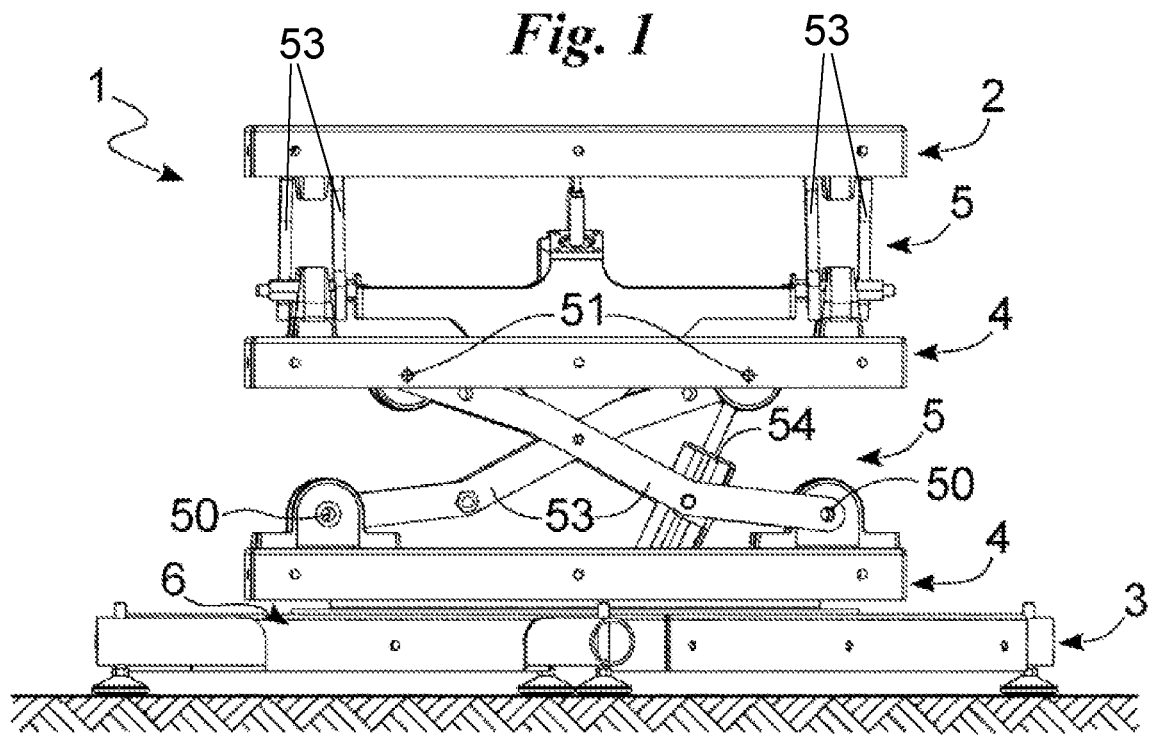
FIG. 1 is a side view of the inertial platform according to the invention in a first configuration.
Figure 2:
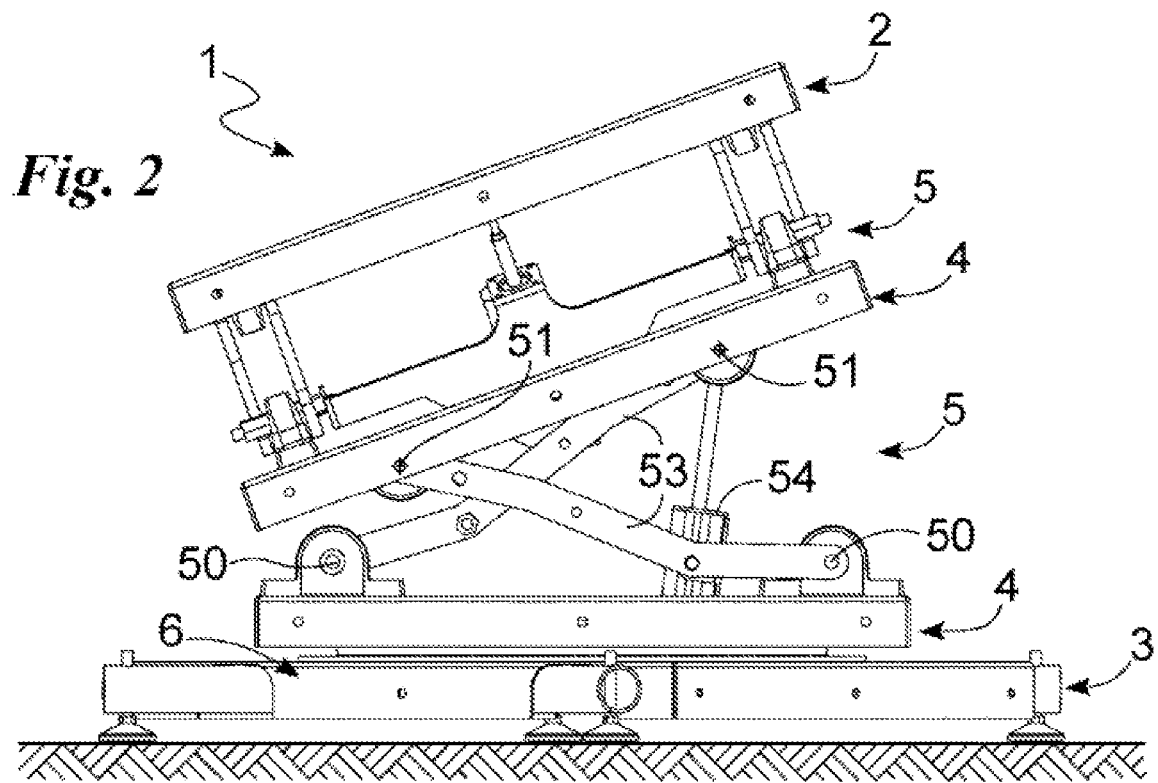
FIG. 2 is a side view of the inertial platform according to the invention in a second configuration.
Figure 3:
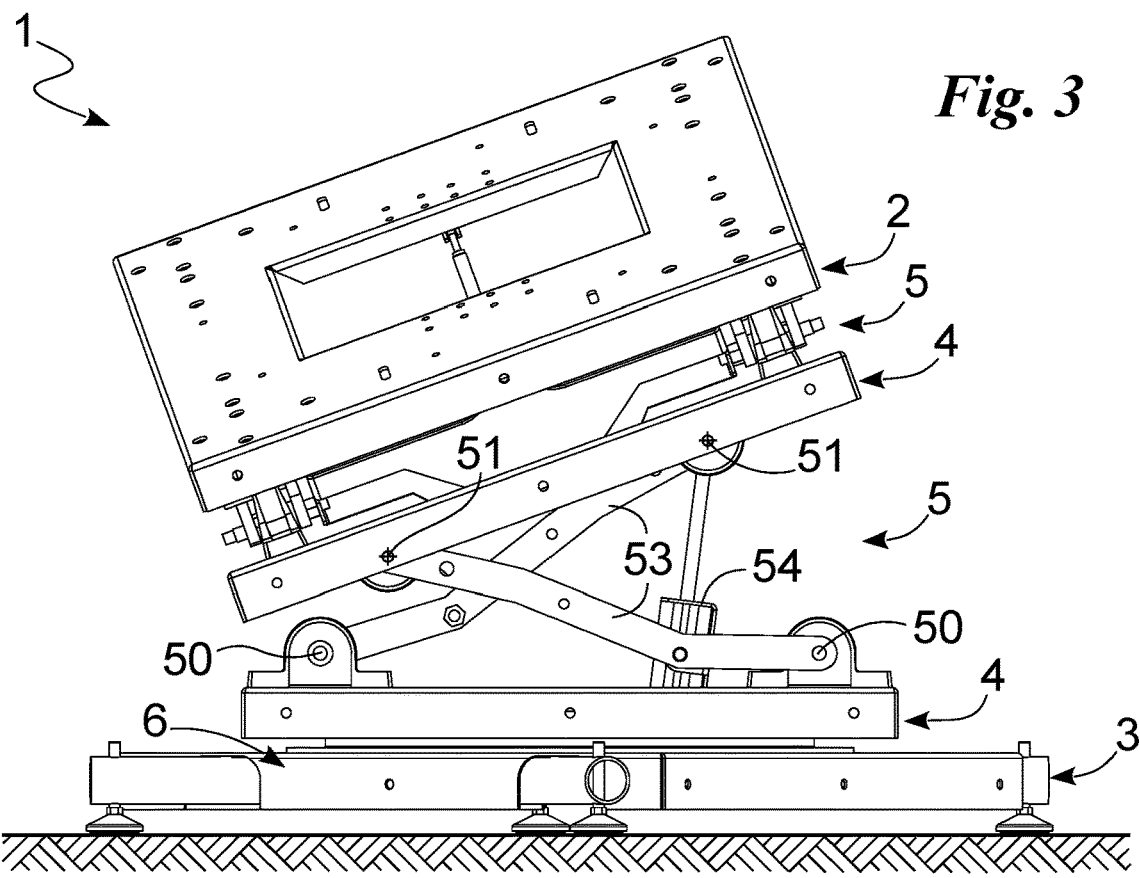
FIG. 3 is a side view of the inertial platform according to the invention in a third configuration.

Furthermore, the intermediate planes 4*a*, the upper plane 2*a* and the base plane 3*a* are preferably all substantially parallel in a rest configuration (FIGS. 1 and 5).

The platform 1 further comprises a plurality of articulated quadrilaterals 5, between the supports 2, 3 and 4, defining said degrees of freedom, and may also comprise means of rotation 6.

Preferably, the articulated quadrilaterals 5 define, in the rest configuration, axes of rotation for the intermediate 4 or upper supports 2 to which they are connected, substantially parallel to the base plane 3a and substantially perpendicular to one another. The means of rotation 6, on the other hand, preferably define an axis of rotation that, in the rest configuration, is substantially perpendicular to said upper plane 2a.

Furthermore, each articulated quadrilateral 5 comprises two lower hinges 50, connected to a first support consisting of a base or intermediate support 3, 4, two upper hinges 51, connected to a second support that follows on vertically from and is above the first support and thus consists of an intermediate or upper support 4, 2.

Each articulated quadrilateral 5 further comprises two rods 53, which connect said lower hinges 50 to said upper hinges 51 in a crossed manner. As can be seen in the Figures, the hinge on the right is connected to the one on the left of the following support and vice versa. Said articulated parallelogram 5 is thus preferably a conventional "Chebyshev linkage" that is however only used in the straight-line part with the crossed rods 53.

Furthermore, in each articulated quadrilateral 5, the rods 53 are preferably substantially of the same length, whereas the distance between the upper hinges 51 is different from, and preferably smaller than, the distance between said lower hinges 50. Substantially, in the rest position, the articulated quadrilateral 5 defines an isosceles trapezium, preferably with the rods 53 defining the legs and preferably with the lower base forming the longer base.

The articulated quadrilaterals 5, already described in ideal and conceptual terms, are structurally composed of several beams and hinges, as shown for example in the accompanying Figures. In particular, each articulated quadrilateral 5 is preferably composed of two parallel and aligned structures, with hinges preferably comprising rods that form part of the hinges on both structures.

Each of the articulated quadrilaterals 5 further comprises motor means 54 suitable to move said articulated quadrilateral 5 internally according to its single degree of freedom defining an axis of rotation 5a.

The motor means 54 preferably comprise a linear actuator, and preferably not more than one, connected to both of the rods 53 not in correspondence with the lower hinges 50, so as to be able to act simultaneously and in opposite directions on both of the rods 53 of a single quadrilateral 5.

The linear actuator is preferably connected to both of the rods in a same right-hand or left-hand portion, and is connected to the rod 53, which in the rest configuration is lower down in that point, at a distance comprised between one half and one eighth of said rod 53. At that distance, the lower rod can be appropriately controlled and moved.

Furthermore, the linear actuator is preferably connected to the upper rod 53 in correspondence with the upper hinge 50.

Appropriately, the linear actuator is connected to the structural part of the quadrilateral by means of hinges. Furthermore, the linear actuator is preferably supported by a cross member that joins two parallel structures forming an articulated quadrilateral.

Lastly, the linear actuator is preferably a worm screw operated by an electric motor, preferably of the permanent magnet type. Alternatively, it may be of the fluid-dynamic type.

As an alternative to that described above, the motor means 54 preferably comprise a linear actuator, and preferably not more than one, detachably arranged between the upper and lower planes of the articulated quadrilateral 5. In this case, the motor means 54 are preferably arranged between the upper plane 2a and the intermediate plane 4a and the intermediate plane 4a and the lower plane 3a.

Furthermore, the motor means 54 exert their action along a direction 54a parallel to the upper and lower planes when the articulated quadrilateral 5 is in the rest condition.

The motor means 54 thus comprise a linear actuator connected to the structure by means of two intermediate hinges 56 to intermediate rods 57.

The intermediate hinges 56, in particular, are preferably arranged at the ends, or close to the ends, of the motor means 54 along the direction 54a defined by the linear actuator.

The intermediate rods 57 preferably connect the intermediate hinges 56 to the lower hinges 50 and to the upper hinges 51.

In particular, each intermediate hinge 56 is preferably connected to a lower hinge 50 and an upper hinge 51 preferably arranged on the same side of the articulated quadrilateral 5 and vertically aligned or in any case close to one another.

Furthermore, the motor means 54 preferably define a direction 54a equidistant from the upper and lower planes of the articulated quadrilateral 5 when the latter is in the rest condition.

Preferably the direction 54a defined by the linear actuator also remains equidistant throughout all the phases of motion of the articulated quadrilateral 5.

The intermediate rods 57 are thus for example arranged in twos on the intermediate hinges 56 and, preferably, are arranged and moved specularly with respect to the direction 54a.

Lastly, the linear actuator is also preferably a worm screw operated by an electric motor, preferably of the permanent magnet type. Alternatively, it may be of the fluid-dynamic type.

The motor means 54 in the alternative configuration have been described in ideal and conceptual terms, and are structurally composed of several beams and hinges, as shown for example in the accompanying Figures. In particular, each intermediate rod 57 is actually composed of two elongated, parallel and aligned structures that join, for example, an intermediate hinge 56 and the lower hinge 50 or upper hinge 51.

The structure composed of the rods 53, of the intermediate rods 56, of the lower hinges 50 and upper hinges 51 and of the intermediate hinges 56 is thus, ideally, a structure with a single degree of freedom which is the degree of freedom controlled by the motor means 54.

The means of rotation 6 are suitable to implement the rotation of the upper support 2, and preferably also of all the intermediate supports 4, about an axis that, in the rest configuration, is perpendicular to the upper plane 2a.

They comprise a fifth wheel 60, preferably integral with a base support 3 or, alternatively, with an intermediate support 4 and a pinion 61, engaging with the fifth wheel 60. The means of rotation 6 further comprise a motor 62 suitable to guide the pinion 61 and integral with an intermediate support 4, preferably with the first intermediate support 4 or with the upper support 2.

The inertial platform 1 further comprises control means, preferably of the electronic type known in the prior art. For example, they may consist of a conventional board known by the name of Arduino®, Raspberry® or the like.

The control means are functionally connected to the motor means 54 and to the motor 62 and are suitable to control the activation and the methods of activation thereof (direction, torque, speed, etc.). They may be connected to command means, such as a joystick or a pushbutton panel, for example. Furthermore, the control means may be made to interface with known electronic systems, in particular with a conventional computer or a gaming console and so forth. The connection interface is also of a known type and is wireless (for example, Bluetooth® or WI-FI) or wired (for example, USB, Thunderbolt or the like).

The functioning of the inertial platform 1 described above in a structural sense, is as follows.

It may, for example, support a seat 100 and rotate along the axes defined by the quadrilaterals 5 or by the means of rotation 6 so as to move said seat and anything connected to it (screens, platforms, etc.). For instance, it may interface with a simulator or driving video game and respond to commands sent from the computerised simulator which correspond to the angle of the car and so forth.

To move the seat, the motor means 54, in particular the linear actuators, simply have to vary their length and position along the quadrilateral 5. This corresponds to a variation in the distance between two hinges arranged on different supports and thus a relative tilting of the first and second support.

In an inventive variant of the invention, the inertial platform 1 of the type described above is used on means of transport, in particular on ships, to make a surface, in particular the surface of a seat or even of a table, of a bed or other surface, stable with respect to the ground surface so that it does not tilt with said means of transport.

In said variant the inertial platform 21 has the base plane 3a, defined by the base support 3 and preferably integral with the ground surface that oscillates or tilts together with said ground surface, and the upper plane 2a, defined by the upper support 2 that, as a consequence of the appropriate active movements imparted by the articulated quadrilaterals 5 and also by the means of rotation 6, remains in a predefined position with respect to the gravitational gradient. Said predefined position is preferably horizontal and may also be in a predefined direction in the horizontal plane.

The inertial platform 1 used on means of transport is thus suitable to cancel out the rolling motion (FIGS. 7c and 7d) and pitching motion (FIGS. 7a and 7b) for a passenger using it.

The inertial platform 1 thus preferably comprises sensing means for detecting the position of the upper plane 2a with respect to the gravitational gradient. Said sensing means are functionally connected to the means of control of the platform and thus suitable to control the articulated quadrilaterals 5 and more in detail the motor means 54, so as to maintain the predefined position with respect to the gravitational gradient.

Said sensing means preferably consist of an accelerometer or gyroscope, for example of the type present in smartphones and various currently used devices, mounted on the upper support 2.

The inertial platform 1 according to the present variant is preferably arranged beneath an individual seat and comprised in the overall dimensions thereof.

The inertial platform 1 in the present variant may also not comprise, in a secondary variant, the articulated quadrilaterals 5 described previously, but may also comprise different types of motor means and movement means, for example rotating motors that turn the supports 2 and 4 and so forth.

The inertial platform 1 in the present variants thus defines an inertial platform for an object preferably arranged on a means of transport, preferably for chairs, tables or the like, preferably on a ship.

The inertial platform 1 according to the invention achieves some important advantages.

It has an extremely compact and lightweight structure. Furthermore, thanks to the position of the linear actuator on both of the rods 53, the system can translate in both directions and save vertical space even after performing the rotations imparted by the quadrilaterals 5. The forces are also shared by both of the rods 53 and are thus better distributed and not discharged to the ground.

Moreover, the "Chebyshev linkage" is known for obtaining a perfect rotational-translational motion along a horizontal line of the median point of the upper side, that is the side that joins the upper hinges 51. Said platform is therefore not raised from its initial position but always remains at the same level and optimises the position of the centre of gravity, substantially without altering it, so that its position is constant or in any case always appropriate and making is possible to optimise the study of the forces to apply via the motor means 54.

Said platform is also straightforward and economical.

Modifications and variations may be made to the invention described herein without departing from the scope of the inventive concept as defined in the claims. All details may be replaced with equivalent elements and the scope of the invention includes all other materials, shapes and dimensions.

The invention claimed is:

1. An inertial platform, comprising:
   an upper support that can be integrally attached to a mobile element and defines an upper plane,
   a base support that can be fixed to the ground and defines a base plane,
   at least one intermediate support arranged between said base support and upper support, wherein the intermediate support is connected to the upper support, wherein the intermediate support is connected to the base, and
   wherein to connect the intermediate support to the base, the inertial platform comprises at least one articulated quadrilateral,
      comprising: two lower hinges, fixed and connected to said base, two upper hinges, fixed and connected to said intermediate support, and two rods which connect said lower hinges to said upper hinges in a crossed manner, and/or
      wherein to connect the intermediate support to the upper support, the inertial platform comprises at least one articulated quadrilateral comprising: two lower hinges, fixed and connected to said intermediate support and two upper hinges, fixed and connected to said upper support, and two rods which connect said lower hinges to said upper hinges in a crossed manner, and
   wherein for each said articulated quadrilateral no hinge is provided between said rods,
   wherein for each said articulated quadrilateral there is respective motor means configured to move said articulated quadrilateral internally according to its single degree of freedom defining an axis of rotation, and
   sensing means to detect the position of said upper plane with respect to the gravitational gradient functionally connected to an electronic controller for control of said platform and at least to said motor means.

2. The inertial platform as claimed in claim 1, wherein there are at least two of said at least one articulated quadrilateral, said articulated quadrilaterals being substantially placed one on top of the other and defining reciprocally oblique axes of rotation.

3. The inertial platform as claimed in claim 1,
   wherein in a respective said articulated quadrilateral, said rods are substantially of the same length, whereas the distance between said upper hinges is different from the distance between said lower hinges.

4. The inertial platform as claimed in claim 1, wherein, in each articulated quadrilateral, said motor means comprise a linear actuator connected to both of said rods not in correspondence with said lower hinges.

5. The inertial platform as claimed in claim 4, wherein said linear actuator is connected to both of the rods in a same right-hand or left-hand portion, and is connected to the rod, which in the rest configuration is lower down, at that point, at a distance comprised between one half and one eighth of said rod.

6. The inertial platform as claimed in claim 1, wherein said motor means further comprise a linear actuator defining a direction parallel to and equidistant from said upper and lower planes, two intermediate hinges and two intermediate rods, said intermediate hinges being arranged at the ends of said linear actuator with respect to said direction and said intermediate rods connecting said intermediate hinges to said lower hinges and upper hinges arranged on the same side of said articulated quadrilateral.

7. The inertial platform as claimed in claim 1, wherein said articulated quadrilateral is a "Chebyshev linkage".

8. The inertial platform as claimed in claim 1, wherein, in a rest configuration, said axes of rotation belonging to different articulated quadrilaterals are substantially perpendicular to one another.

9. The inertial platform as claimed in claim 1, wherein each of said articulated quadrilaterals comprises a plurality of rod and hinge structures, arranged parallel to one another so as to ideally form a single articulated quadrilateral.

10. The inertial platform as claimed in claim 9, configured to keep said upper plane in a predefined position with respect to the gravitational gradient.

11. The inertial system, comprising an inertial platform as claimed in claim 1.

12. An inertial platform, comprising:
an upper support that can be integrally attached to a mobile element and defines an upper plane,
a base support that can be fixed to the ground and defines a base plane,
at least one intermediate support arranged between said base support and upper support, wherein the at least one intermediate support is connected to the upper support, wherein comprising at least one articulated quadrilateral, comprising:
two lower hinges, fixed and connected to one of said base support,
two upper hinges, fixed and connected to one of said intermediate support,
two rods which connect said lower hinges to said upper hinges in a crossed manner, and
no hinge is provided between said rods,
motor means configured to move said articulated quadrilateral internally according to its single degree of freedom defining an axis of rotation,
and sensing means to detect the position of said upper plane with respect to the gravitational gradient functionally connected to means for controlling said platform, suitable to control said motor means, and at least to said motor means.

13. The inertial platform as claimed in claim 12, wherein there are at least two of said at least one articulated quadrilateral, said articulated quadrilaterals being substantially placed one on top of the other and defining reciprocally oblique axes of rotation.

14. The inertial platform as claimed in claim 12, wherein, in each articulated quadrilateral, said motor means comprise a linear actuator connected to both of said rods not in correspondence with said lower hinges.

15. The inertial platform as claimed in claim 14, wherein said linear actuator is connected to both of the rods in a same right-hand or left-hand portion, and is connected to the rod, which in the rest configuration is lower down, at that point, at a distance comprised between one half and one eighth of said rod.

16. The inertial platform as claimed in claim 12, wherein said articulated quadrilateral is a "Chebyshev linkage".

17. The inertial platform as claimed in claim 12, wherein, in a rest configuration, said axes of rotation belonging to different articulated quadrilaterals are substantially perpendicular to one another.

18. The inertial platform as claimed in claim 12, wherein each of said articulated quadrilaterals comprises a plurality of rod and hinge structures, arranged parallel to one another so as to ideally form a single articulated quadrilateral.

19. The inertial platform as claimed in claim 18, configured to keep said upper plane in a predefined position with respect to the gravitational gradient.

20. The inertial system, comprising an inertial platform as claimed in claim 12.

* * * * *